(12) United States Patent
Kim

(10) Patent No.: US 9,911,962 B2
(45) Date of Patent: Mar. 6, 2018

(54) SECONDARY BATTERY

(71) Applicants: SAMSUNG SDI CO., LTD., Yongin-si, Gyeonggi-do (KR); ROBERT BOSCH GMBH, Stuttgart (DE)

(72) Inventor: Duk-Jung Kim, Yongin-si (KR)

(73) Assignees: Samsung SDI Co, Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 640 days.

(21) Appl. No.: 14/256,092

(22) Filed: Apr. 18, 2014

(65) Prior Publication Data

US 2015/0171384 A1   Jun. 18, 2015

(30) Foreign Application Priority Data

Dec. 18, 2013  (KR) .......................... 10-2013-0158674

(51) Int. Cl.
*H01M 2/10* (2006.01)
*H01M 4/78* (2006.01)
(Continued)

(52) U.S. Cl.
CPC ............. *H01M 2/206* (2013.01); *H01M 2/26* (2013.01); *H01M 2/30* (2013.01); *H01M 10/0413* (2013.01)

(58) Field of Classification Search
CPC .......... H01M 2/206; H01M 2/30; H01M 2/26; H01M 2/0217; H01M 2/10; H01M 2/1061;
(Continued)

(56) References Cited

U.S. PATENT DOCUMENTS

2006/0024578 A1   2/2006   Lee
2011/0250491 A1*  10/2011  Kim .................... H01M 2/0207
                                                429/176
(Continued)

FOREIGN PATENT DOCUMENTS

JP   2002-141035 A   5/2002
JP   2008-235099 A   10/2008
(Continued)

OTHER PUBLICATIONS

Korean Office Action dated Nov. 18, 2016 in Corresponding Korean Patent Application No. 10-2013-0158674.
(Continued)

*Primary Examiner* — Ula C Ruddock
*Assistant Examiner* — Matthew W Van Oudenaren
(74) *Attorney, Agent, or Firm* — Lee & Morse, P.C.

(57) ABSTRACT

A secondary battery includes a case having an opening therein, a cap plate attached to the case, a plurality of electrode assemblies in the case, each electrode assembly including a positive electrode plate, a negative electrode plate, and a separator between the positive electrode plate and the negative electrode plate, and uncoated edges of the positive and negative electrode plates extending out of each electrode assembly defining electrodes, an electrode terminal protruding outside the cap plate, a gasket covering the electrode terminal, an electrode current collector electrically connecting the electrode assemblies and the electrode terminal, a retainer between the electrode current collector and the case, the retainer being connected to the electrode assemblies, and a damper on a front side of the retainer that faces the electrode assemblies, the damper extending to be positioned between the electrodes of adjacent electrode assemblies.

13 Claims, 12 Drawing Sheets

(51) Int. Cl.
*H01M 2/20* (2006.01)
*H01M 2/26* (2006.01)
*H01M 2/30* (2006.01)
*H01M 10/04* (2006.01)

(58) Field of Classification Search
CPC ........ H01M 2/1094; H01M 2/14; H01M 2/20;
H01M 2/202; H01M 2/204; H01M 2/22;
H01M 2/24; H01M 2/34; H01M 2/06;
H01M 2/38; H01M 2/263; H01M
10/0413; H01M 10/02
See application file for complete search history.

(56) References Cited

U.S. PATENT DOCUMENTS

| 2011/0311851 A1* | 12/2011 | Shinoda | H01M 2/263 |
| | | | 429/94 |
| 2012/0052341 A1 | 3/2012 | Kim et al. | |
| 2012/0171525 A1* | 7/2012 | Guen | H01M 2/0275 |
| | | | 429/53 |
| 2012/0258356 A1 | 10/2012 | Kim | |
| 2013/0011699 A1* | 1/2013 | Kim | H01H 85/36 |
| | | | 429/7 |

FOREIGN PATENT DOCUMENTS

| JP | 2012-038529 A | 2/2012 |
| KR | 10-2012-0024412 A | 3/2012 |
| KR | 10-2012-0114495 A | 10/2012 |
| KR | 10-2013-0039572 A | 4/2013 |

OTHER PUBLICATIONS

Registration Determination Certificate issued by the Korean Industrial Property Office dated May 30, 2017 in the examination of Korean Patent Application No. 10-2013-158674.

\* cited by examiner

SECONDARY BATTERY

CROSS-REFERENCE TO RELATED APPLICATION

Korean Patent Application No. 10-2013-0158674, filed on Dec. 18, 2013, in the Korean Intellectual Property Office, and entitled: "Secondary Battery," is incorporated by reference herein in its entirety.

BACKGROUND

1. Field

One or more embodiments relate to secondary batteries having improved insulating properties.

2. Description of the Related Art

In general, secondary batteries refer to rechargeable batteries and are widely used in small-sized mobile devices, e.g., smart phones, ultra-slim notebook computers, tablet personal computers (PCs), portable information terminals, camcorders, and digital cameras, or medium or large-sized electronic devices, e.g., electric cars, hybrid electric cars, electric bicycles, uninterrupted power supplies (UPSs), and energy storage systems (ESSs). In the medium or large-sized electronic devices, dozens of secondary batteries are connected in series or in parallel. Since the secondary batteries are used over a long period of time by recharge, they need to have electrical and structural stability between their elements during the period of use.

SUMMARY

According to one or more embodiments, a secondary battery includes a case having an opening therein, a cap plate attached to the case, a plurality of electrode assemblies in the case, each electrode assembly including a positive electrode plate, a negative electrode plate, and a separator between the positive electrode plate and the negative electrode plate, and uncoated edges of the positive and negative electrode plates extending out of each electrode assembly defining electrodes, an electrode terminal protruding outside the cap plate, a gasket covering the electrode terminal, an electrode current collector electrically connecting the electrode assemblies and the electrode terminal, a retainer between the electrode current collector and the case, the retainer being connected to the electrode assemblies, and a damper on a front side of the retainer that faces the electrode assemblies, the damper extending to be positioned between the electrodes of adjacent electrode assemblies.

The electrode current collector may include a first portion that is parallel to the cap plate and is electrically connected to the electrode terminal, a second portion that is bent with respect to the first portion and is connected to the electrode of the electrode assembly, and a third portion that connects the first portion and the second portion to each other, wherein the electrode current collector may be joined to the retainer on which the damper is disposed.

The retainer may include a base and a side portion that is bent from the base, the damper may protrude from a front side of the base toward the electrode assembly, and the second portion of the electrode current collector may extend from both edges of the third portion in a vertical direction of the retainer and be located between the damper and the side portion of the retainer.

The damper may be disposed between the electrodes of the adjacent electrode assemblies, the second portion of the electrode current collector may be interposed between the damper and the electrode of the electrode assembly to be electrically connected to one side of the electrode of the electrode assembly, and the side portion of the retainer may be located on the other side of the electrode assembly.

The retainer may include a base and a side portion that is bent from the base, the damper may protrude from a front side of the base toward the electrode assembly, and the second portion of the electrode current collector may extend from both edges of the third portion in a vertical direction of the retainer and be located in a space between the base and the damper.

The damper may include a damper plate that is spaced apart from the base of the retainer toward the electrode assembly, and a damper support that is installed between the base and the damper plate to connect the base and the damper plate to each other.

A guide groove may be formed at the third portion of the electrode current collector, and the electrode current collector may be slidably joined to an insulator through the guide groove in a horizontal direction.

The insulator may include a housing, and an insulator plate that extends in a horizontal direction from the housing, wherein a top portion of the housing and the insulator plate may be spaced from each other to form a space for accommodating the first portion of the electrode current collector, and the insulator plate may be inserted along the guide groove of the third portion of the electrode current collector such that the first portion is located on the insulator plate.

The gasket covering the electrode terminal may be inserted between the insulator plate and the top portion of the housing such that the electrode terminal is connected to the first portion of the electrode current collector.

The retainer may include a base and a side portion that is bent from the base, wherein the damper may protrude from a front side of the base toward the electrode assembly, the electrode current collector may be joined to an insulator, and the retainer may be hinge-joined to the insulator to be installed pivotally with respect to the electrode current collector.

The insulator may include an insulator plate, and a side portion that is bent from one edge of the insulator plate, wherein the first portion of the electrode current collector may be located on the insulator plate, a through hole providing a path, through which the electrode current collector passes, may be formed at the side portion, and a first hinge pin may be installed on each sidewall of the side portion and a second hinge pin may be installed under the first hinge pin.

The first portion of the electrode current collector may be disposed on the insulator plate by being bent toward the insulator plate while passing through the through hole formed at the side portion of the insulator.

A plurality of hooks may be formed at both edges of the insulator plate, and the first portion of the electrode current collector and an electrode terminal located on the first portion may be fastened to the hook to be fixed to the insulator plate.

A plurality of guides may be formed on the base of the retainer, a first hole having a circular shape and a second hole having a streamlined shape may be formed at the guide, the first hinge pin may be hinge-joined to the first hole, the second hinge pin may be hinge-joined to the second hole, and the second hinge pin may move along the second hole such that the retainer pivots with respect to the electrode current collector.

The retainer may include a base and a side portion that is bent from the base, wherein the damper may be disposed on a front side of the base and is joined to the electrode current collector, and the retainer may be hinge-joined to the damper to be installed pivotally with respect to the electrode current collector.

The damper may include at least one damping portion that protrudes from the front side of the base toward the electrode assembly, a guide shaft that is formed on a rear side of the damping portion to support the damping portion, a damping plate that is bent from an upper end of the guide shaft, and a side portion that is disposed between the guide shaft and the damping plate to connect the guide shaft and the damping plate, wherein the first portion of the electrode current collector may be located on the damping plate, a through hole providing a path, through which the electrode current collector passes, may be formed at the side portion, and a first hinge pin may be formed on each sidewall of the side portion and a second hinge pin may be formed under the first hinge pin.

The second portion of the electrode current collector may extend in a vertical direction from both edges of the third portion and be joined by passing through the through hole of the side portion of the damper in a downward direction from a top portion of the damper plate, and the first portion of the electrode current collector may be bent toward the damping plate to be disposed on the damping plate.

The second portion of the electrode current collector may be located in a space between the damping portion and the base of the retainer.

A plurality of hooks may be formed at both edges of the damping plate, and the first portion of the electrode current collector and an electrode terminal located on the first portion may be fastened to the hook to be fixed to the damping plate.

A guide may be formed on the base of the retainer, a first hole having a circular shape and a second hole having a streamlined shape may be formed at the guide, the first hinge pin may be hinge joined to the first hole, the second hinge pin may be hinge-joined to the second hole, and the second hinge pin may move along the second hole such that the retainer pivots with respect to the electrode current collector.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
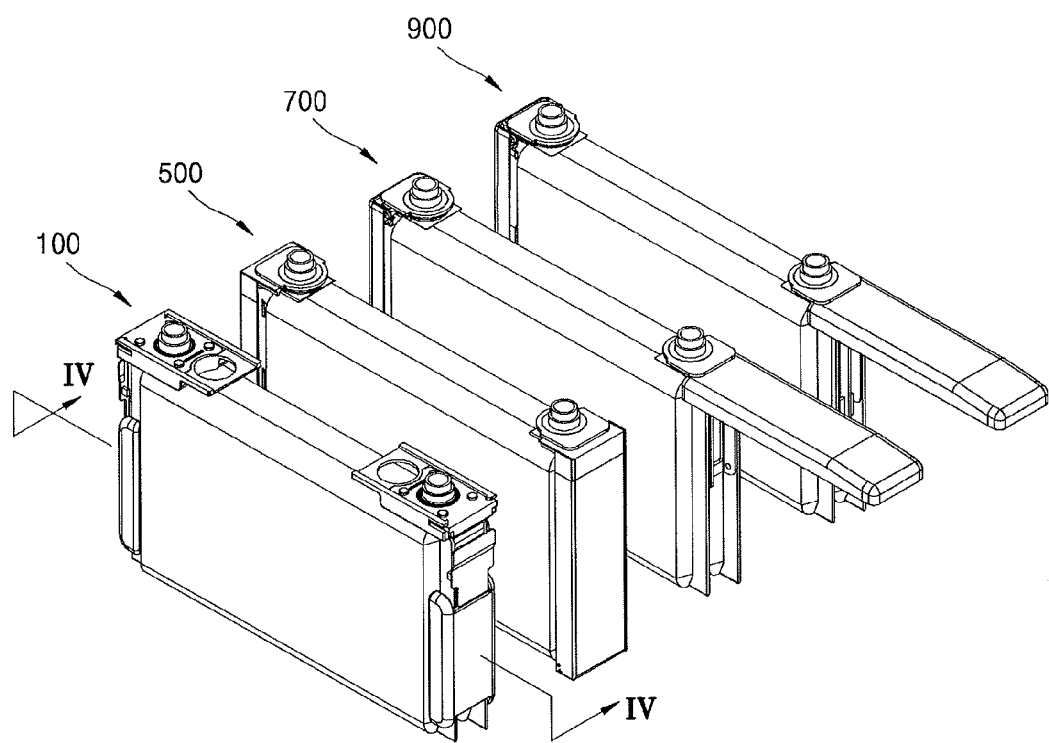
FIG. 1 illustrates a perspective view of secondary batteries according to embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Embodiments may include various modifications, and exemplary implementations thereof are illustrated in the drawings and will be described herein in detail. However, it will be understood that the embodiments are not limited and include all modifications, equivalents and substitutions falling within the spirit and scope of the present description. In the following description, detailed descriptions of well-known functions or configurations will be omitted since they would unnecessarily obscure the subject matters of the present invention.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Although terms such as "first" and "second" may be used herein to describe various elements or components, these elements or components should not be limited by these terms. These terms are only used to distinguish one element or component from another element or component.

The terminology used herein is for the purpose of describing particular embodiments only and is not intended to be limiting of the inventive concept. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

Hereinafter, secondary batteries according to embodiments will be described in detail with reference to the accompanying drawings. In the following description, like reference numerals denote like elements, and a redundant description thereof will be omitted.

FIG. 1 is a perspective view of secondary batteries 100, 500, 700, and 900 according to embodiments.

Each of the secondary batteries 100, 500, 700, and 900 is configured such that insulating properties are improved by providing a retainer at a side portion of an electrode assembly. That is, flowage, i.e., electrical contact, between adjacent electrode assemblies within a same case is prevented by installing a damper between the adjacent electrode assemblies. Further, assembly of a plurality of electrodes assemblies with the damper is facilitated by joining the retainer and an electrode current collector by a joining method, e.g., an integrated type or a hinge type. Hereinafter, the secondary batteries 100, 500, 700, and 900 according to the embodiments will be described separately.

Figure 2:
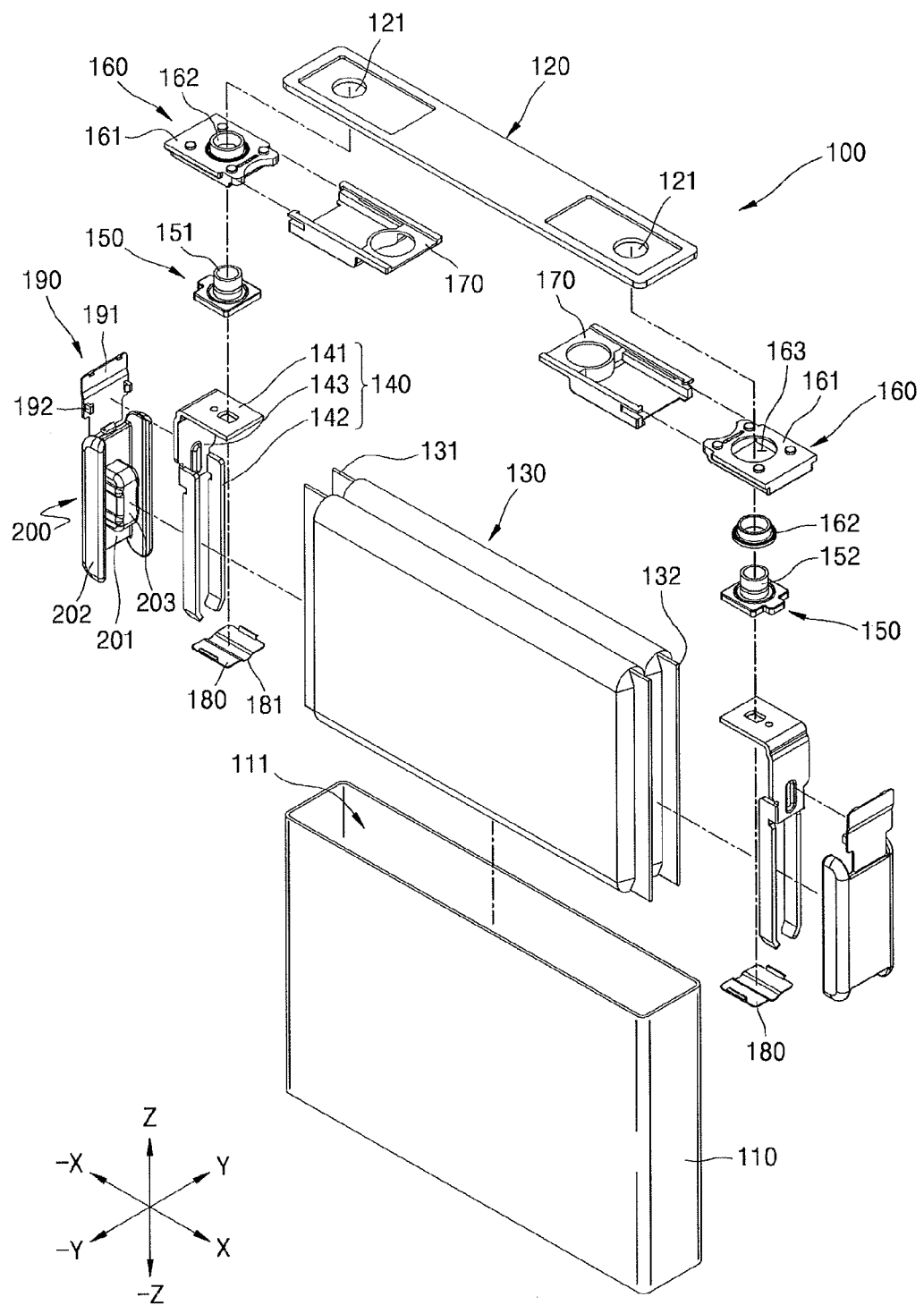
FIG. 2 illustrates an exploded perspective view of a secondary battery of FIG. 1.
Figure 3:
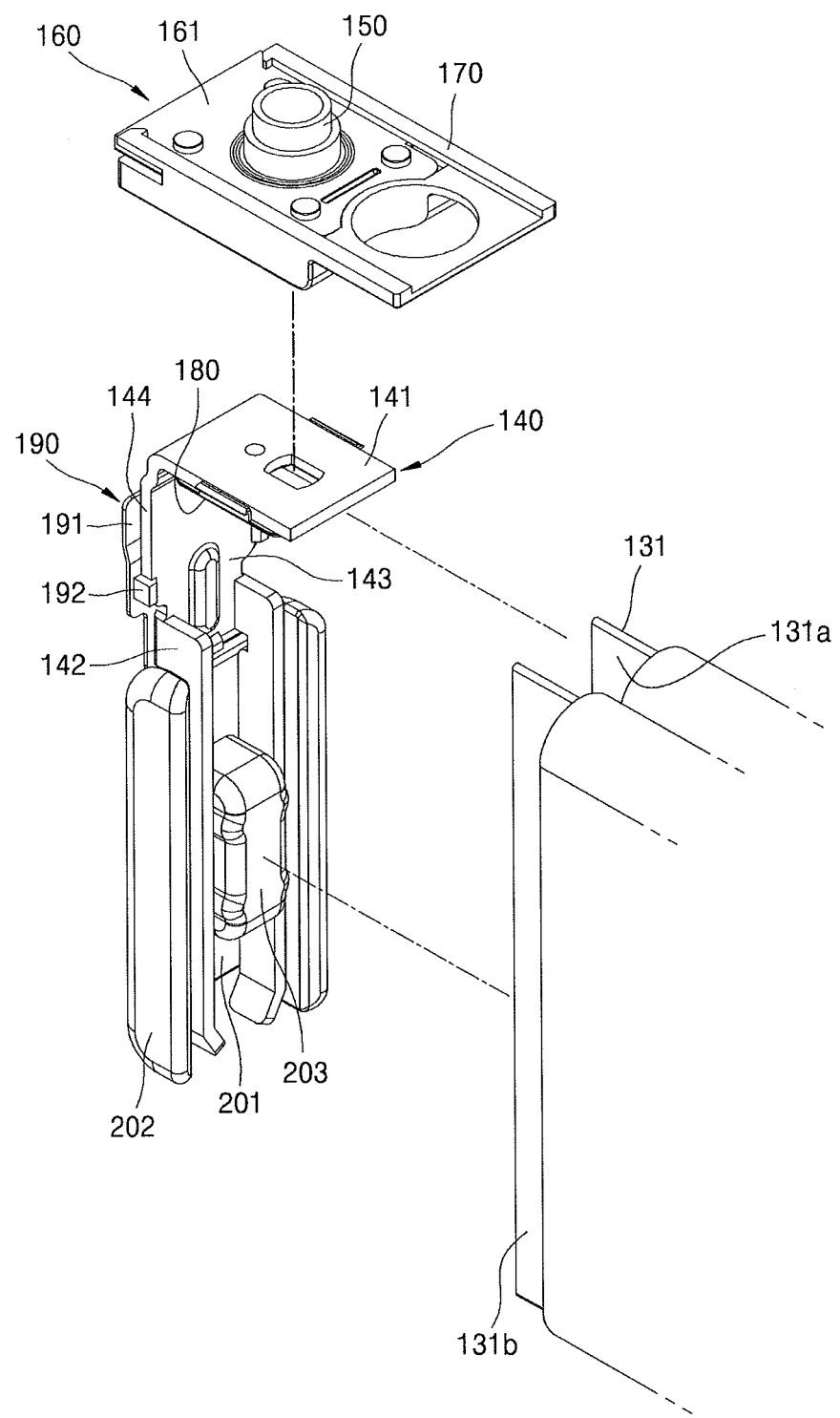
FIG. 3 illustrates an expanded exploded perspective view of a damper in FIG. 2.
Figure 4:
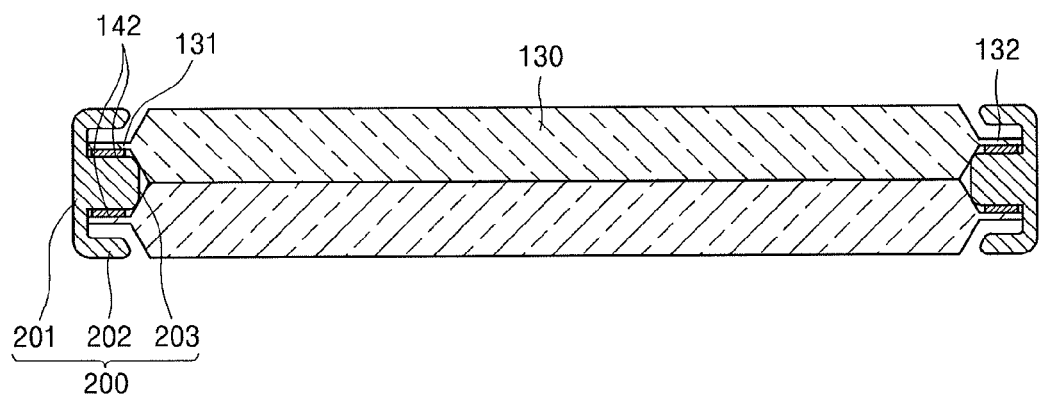
FIG. 4 illustrates a cross-sectional view taken along line IV-IV in FIG. 1.

FIG. 2 is an exploded perspective view of the secondary battery 100 according to an embodiment, FIG. 3 is an expanded exploded perspective view of a portion at which a damper 203 of FIG. 2 is installed, and FIG. 4 is a cross-sectional view taken along line IV-IV in FIG. 1.

Referring to FIGS. 2 to 4, the secondary battery 100 may include a case 110, a cap plate 120, an electrode assembly 130, an electrode current collector 140, an electrode terminal 150, a gasket 160, and a retainer 200.

The case 110 may have a shape of a hollow rectangular parallelepiped. An opening 111 providing a passage for accommodating the electrode assembly 130 may be formed at one side of the case 110. The case 110 may be formed of a metal material in order to have rigidity. For example, the case 110 may be formed of aluminum or an aluminum alloy.

The electrode assembly 130 is accommodated in an internal space of the case 110 through the opening 111. One or more electrode assemblies 130 may be disposed and arranged along a Y direction.

The electrode assembly 130 includes a positive electrode plate, a negative electrode plate, and a separator that is interposed between the positive electrode plate and the negative electrode plate. The positive electrode plate includes a positive electrode coated portion that is a region in which a metal (e.g., aluminum) foil is coated with a positive electrode active material, and a positive electrode uncoated portion that is not coated with the positive electrode active material. The negative electrode plate includes a negative electrode coated portion that is a region in which a metal (e.g., copper) foil is coated with a negative electrode active material, and a negative electrode uncoated portion that is not coated with the negative electrode active material.

The electrode assembly 130 is formed by stacking the positive electrode coated portion, the positive electrode plate having the positive electrode uncoated portion, the separator, the negative electrode coated portion, and the negative electrode plate having the negative electrode uncoated portion sequentially and winding the resulting structure. The electrode assembly 130 may be a jelly-roll shape. The positive electrode uncoated portion and the negative electrode uncoated portion are formed to be exposed in opposite directions, e.g., along opposite direction of the X direction as illustrated in FIG. 2. The positive electrode uncoated portion exposed in the (−X) direction may be a positive electrode 131 of the electrode assembly 130, and the negative electrode uncoated portion exposed in the (+X) direction may be a negative electrode 132 of the electrode assembly 130.

In the present embodiment, the electrode assembly 130 is formed by winding the positive electrode plate, the separator, and the negative electrode plate; however, embodiments are not limited thereto. In another embodiment, the electrode assembly 130 may be a stack-type electrode assembly that is formed by stacking the positive electrode plate, the separator, and the negative electrode plate sequentially.

The cap plate 120 is joined to the case 110. The cap plate 120 is joined to seal the opening 111 of the case 110. Like the case 110, the cap plate 120 may be formed of a metal material, e.g., aluminum or an aluminum alloy. A plurality of terminal holes 121 are formed at the cap plate 120.

The electrode terminal 150 includes a positive electrode terminal 151 that functions as a positive electrode of the secondary battery 100, and a negative electrode terminal 152 that functions as a negative electrode of the secondary battery 100. A portion of the electrode terminal 150 protrudes outside the cap plate 120 after passing through the terminal hole 121 formed at the cap plate 120.

The gasket 160 covers at least a portion of the electrode terminal 150. A gasket housing 161 is provided at the gasket 160. A gasket hole 163 is formed at the gasket housing 161. A seal 162 having a hollow is joined to the gasket hole 163. The seal 162 is joined to the gasket housing 161. Alternatively, the gasket housing 161 and the seal 162 may be formed in an integrated type. The electrode terminal 150 passes through the seal 162 in an upward direction of the gasket housing 161 and protrudes upward from the gasket housing 161.

A portion of the gasket 160, e.g., the seal 162, is interposed between the outer periphery of the electrode terminal 150 and the inner periphery of the cap plate 120 at which the terminal hole 121 is formed. The gasket 160 is formed of an insulating material. The gasket 160 may fill a minute gap between the cap plate 120 and the electrode terminal 150 and electrically insulate the cap plate 120 and the electrode plate 150 from each other. The gasket 160 may be slidably joined to an upper retainer 170 that is formed of an insulating material.

For example, since the positive electrode terminal 151 and the negative electrode terminal 152 pass through the cap plate 120, an electrolyte may potentially leak through a gap that between the outer periphery of the positive electrode terminal 151 and the terminal hole 121 of the cap plate 120 or between the negative electrode terminal 152 and the terminal hole 121 of the cap plate 120. However, since the gasket 160 is interposed between the outer periphery of the electrode terminal 150 and the inner periphery of the cap plate 120 to fill the minute gap therebetween, the airtightness thereof may be maintained and the potential leakage may be prevented. Also, since the positive electrode terminal 151, the negative electrode terminal 152, and the cap plate 120 are all formed of a conductive metallic material, the gasket 160 formed of an insulating material electrically insulates the positive electrode terminal 151 and the cap plate 120 or the negative electrode terminal 152 and the cap plate 120 from each other.

The electrode current collector 140 electrically connects the electrode terminal 150 and the electrode assembly 130. The electrode current collector 140 may include a first portion 141 that is substantially parallel to the cap plate 120, and a second portion 142 that extends from the first portion 141 and is bent with respect to the first portion 141. A third portion 143 is formed between the first portion 141 and the second portion 142 to connect the first portion 141 and the second portion 142.

The first portion 141 of the electrode current collector 140 has a plate shape. The second portion 142 of the electrode current collector 140 is a strip that is bent in a perpendicular direction with respect to the first portion 141 of the electrode current collector 140 and extends by a predetermined length.

In the present embodiment, the second portion 142 of the electrode current collector 140 includes two strips that extend in a vertical direction (Z direction) from both edges of the third portion 143 of the electrode current collector 140. However, the number of second portions 142 of the electrode current collector 140 may vary according to the number of electrode assemblies 130.

The first portion 141 of the electrode current collector 140 is electrically connected to the electrode terminal 150 while contacting a bottom surface of the electrode terminal 150.

The second portion 142 of the electrode current collector 140 may be electrically connected to the electrode assembly 130 while contacting the electrode uncoated portions of the electrode assembly 130, i.e., the positive electrode 131 and the negative electrode 132. The second portion 142 of the electrode current collector 140 may be welded and electrically connected to the positive electrode 131 and the negative electrode 132 of the electrode assembly 130.

A bottom insulator 180 may be installed under the first portion 141. The bottom insulator 180 may be interposed between the electrode assembly 130 and the electrode current collector 140 to electrically insulate the electrode assembly 130 and the electrode current collector 140. The bottom insulator 180 is located under the first portion 141 of the electrode current collector 140 to cover a bottom surface of the first portion 141 of the electrode current collector 140.

The retainer 200 is installed between the electrode current collector 140 and the case 110. The retainer 200 is joined to both side portions of the electrode assembly 130 from which the electrodes 131 and 132 extend.

The retainer 200 electrically insulates the electrode current collector 140 and the case 110 from each other. The retainer 200 may fix the position of the electrode current collector 140. The retainer 200 may fix the position of the positive electrode 131 and the position of the negative electrode 132.

In order to prevent the flowage, e.g., electrical contact, of the electrode assemblies 130 and to provide the electrical insulation between components around the electrode assemblies 130, a damper 203 is installed between adjacent electrodes 131 and between adjacent electrodes 132 of the adjacent electrode assemblies 130. The damper 203 is disposed on a front side of the retainer 200 that faces a side portion of the electrode assembly 130, as will be described in more detail below with reference to FIG. 3.

Referring to FIG. 2, the retainer 200 may include a base 201 and a side portion 202 that is bent from both edges of the base 201 toward the electrode assembly 130. The base 201 is a plate that has a rectangular shape. The side portion 202 is bent by about 90 degrees from both edges of the base 201 in a horizontal direction (Y direction).

The damper 203 is formed on a front side of the base 201. In the present embodiment, the damper 203 is integrated with the base 201 and protrudes by a predetermined height from the base 201.

The electrode current collector 140 is disposed between the retainer 200 and the electrode assembly 130. The electrode current collector 140 includes the first portion 141, the second portion 142 that is bent from the first portion 141 and is parallel to a vertical direction (Z direction) of the retainer 200, and the third portion 143 that connects the first portion 141 and the second portion 142. For example, a plurality of second portions 142 may be disposed from both edges of the third portion 143.

Referring to FIG. 3, the electrode current collector 140 is joined to the retainer 200 at which the damper 203 is disposed. That is, the second portion 142 of the electrode current collector 140 is disposed in a space that is formed by the base 201 and the side portion 202 of the retainer 200. For example, the plurality of side portions 142 may be located between the damper 203 and the side portion 202 of the retainer 200.

A current collector retainer 190 is disposed on a rear surface of the third portion 143 of the electrode current collector 140. The current collector retainer 190 includes a base 191 and a hook 192 that is formed at both edges of the base 191. The base 191 of the current collector retainer 190 has a size covering, e.g., completely overlapping the rear surface of, the third portion 143 of the electrode current collector 140, and both edges of the third portion 143 of the electrode current collector 140 are fixed by the hooks 192.

A process of joining the components at the side portion of the electrode assembly 130 of the secondary battery 100 having the above configuration will be described below.

The third portion 143 of the electrode current collector 140 surface-contacts the base 191 of the current collector retainer 190, and both edges of the third portion 143 are fastened to the hook 192 formed at both edges of the base 191. Therefore, the third portion 143 of the electrode current collector 140 is joined, e.g., affixed, to the current collector retainer 190.

The second portion 142 of the electrode current collector 140 is disposed in the space formed, e.g., defined, by the base 201 and the side portion 202 of the retainer 200. The retainer 200 is joined to the side portion of the electrode assembly 130 with the electrode current collector 140 interposed therebetween. In detail, the second portion 142 of the electrode current collector 140 is welded to an inner surface 131a of the positive electrode 131 of the electrode assembly 130, and the side portion 202 of the retainer 200 is located at an outer surface 131b of the positive electrode 131 of the electrode assembly 130. In other words, as illustrated in FIG. 4, the positive electrode 131 may be inserted between an outer surface of the second portion 142 of the electrode current collector 140 and an inner surface of the side portion 202 of the retainer 200. In the present embodiment, although the positive electrode 131 has been exemplarily described for convenience of description, the negative electrode 132 may also be similarly applied.

As further illustrated in FIG. 4, the damper 203 protruding from the base 201 of the retainer 200 is located in a space between adjacent positive electrodes 131 or in a space between adjacent negative electrodes 132. In this manner, since the damper 203 is interposed between adjacent electrodes 131 and 132 protruding from both sides of the electrode assembly 130, the flowage, e.g., electrical contact, of adjacent electrode assemblies 130 in the single case 110 may be prevented.

Figure 5:
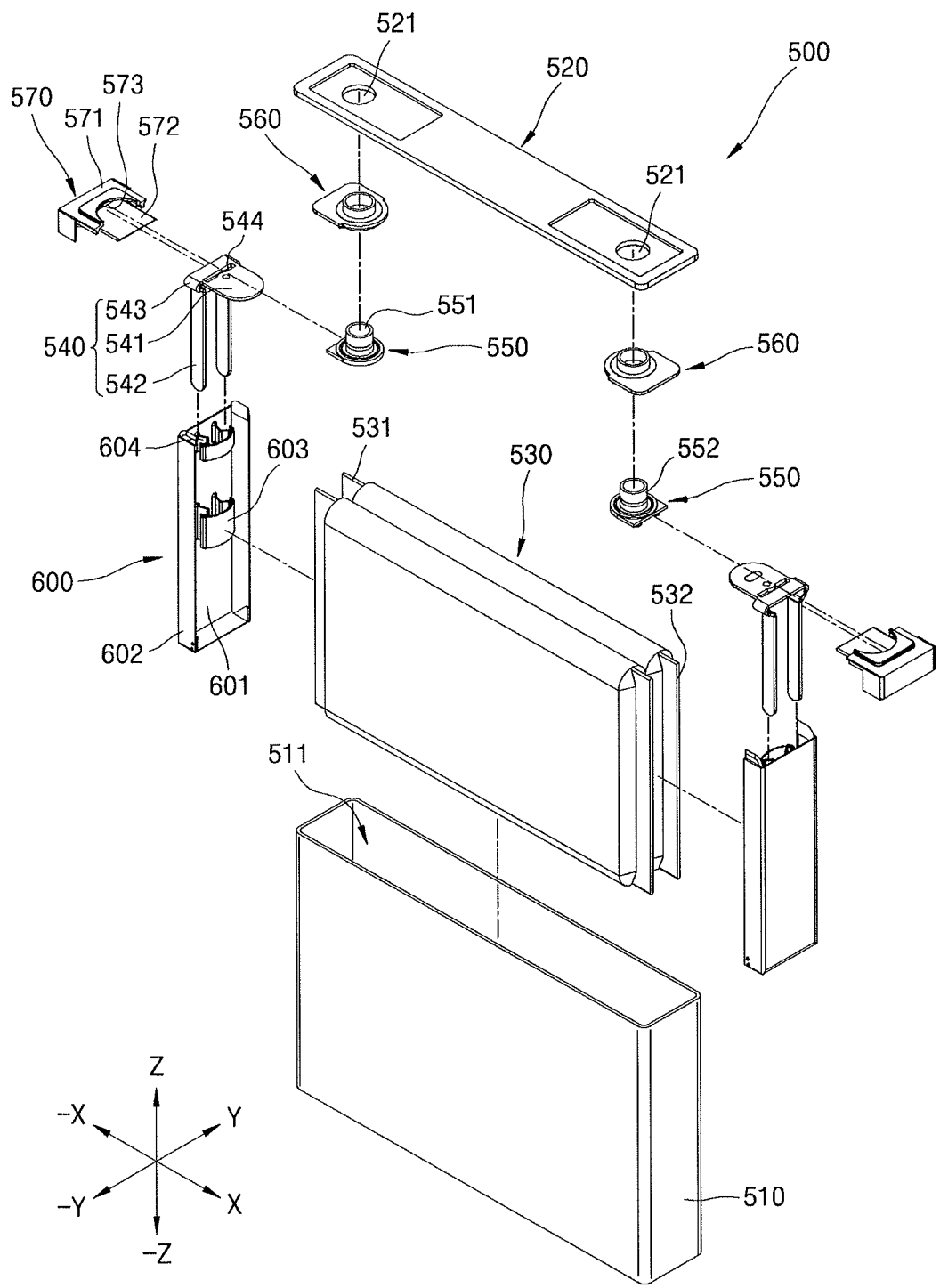
FIG. 5 illustrates an exploded perspective view of a secondary battery according to another embodiment.
Figure 6:
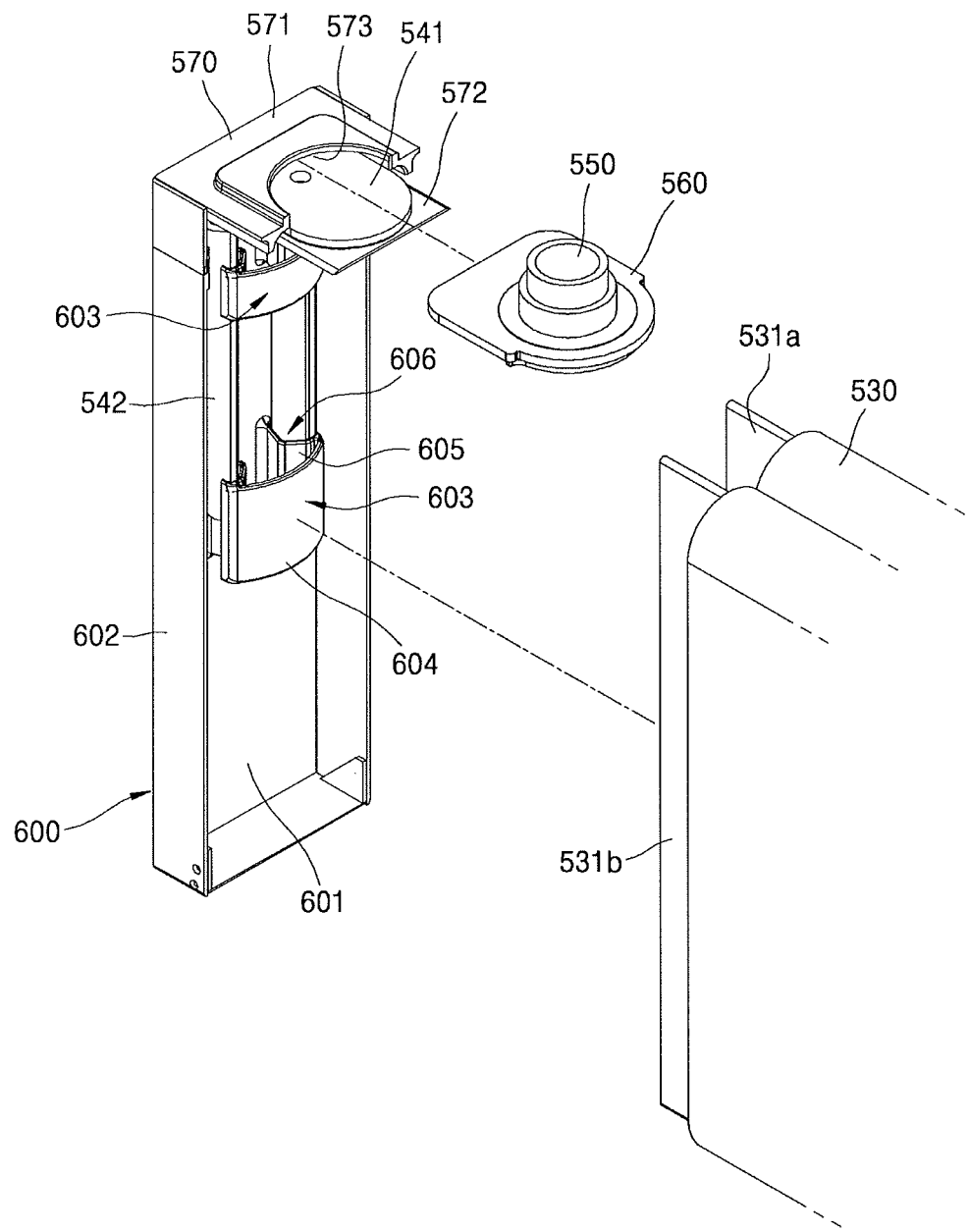
FIG. 6 illustrates an expanded exploded perspective view of a damper in FIG. 5.
Figure 11:
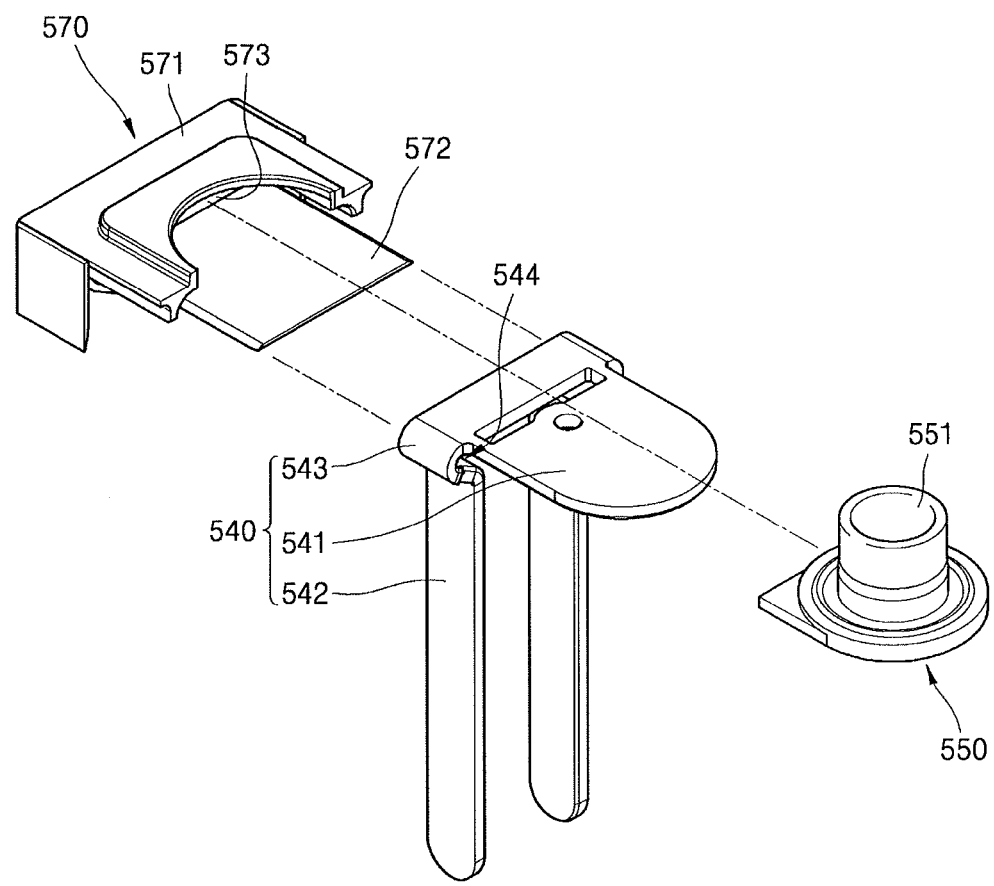
FIG. 11 illustrates an exploded perspective view of the electrode current collector in FIG. 5.

FIG. 5 is an exploded perspective view of the secondary battery 500 according to another embodiment, and FIG. 11 illustrates an exploded perspective view of the electrode current collector in FIG. 5. FIG. 6 is an expanded exploded perspective view of a portion at which a damper 603 of FIG. 5 is installed.

Referring to FIGS. 5-6 and 11, the secondary battery 500 may include a case 510, a cap plate 520, an electrode assembly 530, an electrode current collector 540, an electrode terminal 550, a gasket 560, and a retainer 600.

An opening 511 providing a passage for accommodating the electrode assembly 530 may be formed at one side of the case 510. The electrode assembly 530 is accommodated in an internal space of the case 510 through the opening 511. One or more electrode assemblies 530 may be disposed and arranged along a Y direction. In the present embodiment, two electrode assemblies 530 are provided. In each electrode assembly 530, a positive electrode uncoated portion of a positive electrode plate exposed in a (−X) direction is a positive electrode 531, and a negative electrode uncoated portion of a negative electrode plate exposed in a (+X) direction is a negative electrode 532.

The cap plate 520 is joined to the case 510. A plurality of terminal holes 521 may be formed at the cap plate 520.

The electrode terminal 550 may include a positive electrode terminal 551 and a negative electrode terminal 552. A portion of the electrode terminal 550 protrudes upward from the cap plate 520 after passing through the terminal hole 521 formed at the cap plate 520.

The gasket 560 covers at least a portion of the electrode terminal 550. The electrode terminal 550 passes through a hole, which is formed at the gasket 560, in an upward direction of a gasket housing and protrudes upward from the gasket 560. A portion of the gasket 560 is interposed between an outer periphery of the electrode terminal 550 and an inner periphery of the cap plate 520 at which the terminal hole 521 is formed. The gasket 560 is formed of an insulating material.

The electrode current collector 540 electrically connects the electrode terminal 550 and the electrode assembly 530. The electrode current collector 540 includes a first portion 541 that is substantially parallel to the cap plate 520, and a second portion 542 that extends from the first portion 541 and is bent with respect to the first portion 541. A third portion 543 is formed between the first portion 541 and the second portion 542 to connect the first portion 541 and the second portion 542.

The first portion 541 of the electrode current collector 540 has a plate shape, and the second portion 542 of the electrode current collector 540 is a strip that is bent in a perpendicular direction with respect to the first portion 541 of the electrode current collector 540 and extends by a predetermined length. The second portion 542 of the electrode current collector 540 is strips that extend downward from both edges of the third portion 543 of the electrode current collector 540.

In the present embodiment, the second portion 542 of the electrode current collector 540 includes two strips. However, the number of strips in the second portion 542 of the electrode current collector 540 may vary according to the number of electrode assemblies 530, i.e., the number of electrodes 531 and 532 that extend from the electrode current collector 540.

The first portion 541 of the electrode current collector 540 is electrically connected to the electrode terminal 550 while contacting a bottom surface of the electrode terminal 550. The second portion 542 of the electrode current collector 540 may be electrically connected to the electrode assembly 530 while contacting the positive electrode 531 and the negative electrode 532. The second portion 542 of the electrode current collector 540 may be welded and electrically connected to the positive electrode 531 and the negative electrode 532 of the electrode assembly 530.

The retainer 600 is installed between the electrode current collector 540 and the case 510. The retainer 600 may fix the position of the positive electrode 531 and the position of the negative electrode 532.

In order to prevent the flowage of the adjacent electrode assemblies 530, a damper 603 is installed between the positive electrode 531 and the negative electrode 532 of the electrode current collectors 530. The damper 603 is joined to a front side of the retainer 600 that faces a side portion of the electrode assembly 530. This will be described below in more detail.

The retainer 600 includes a base 601 and a side portion 602 that is bent from both edges of the base 601 toward the electrode assembly 530. The base 601 may be a rectangular plate. The side portion 602 is bent from both edges of the base 201 in a horizontal direction (Y direction).

A damper 603 is formed on a front side of the base 601. In the present embodiment, the damper 603 is integrated with the base 601 and protrudes by a predetermined height from the base 601. For example, a plurality of dampers 603 may be formed in a vertical direction (Z direction) of the base 601, e.g., two dampers 603 are illustrated in FIGS. 5-6.

The damper 603 includes a damper plate 604 that is spaced apart from the base 601 of the retainer 600 by a predetermined distance toward the electrode assembly 530. The damper plate 604 forms a streamline shape. As illustrated in FIG. 6, a space 606 for accommodating the second portion 542 of the electrode current collector 540 is provided between the base 601 and the damper plate 604.

The damper plate 604 is connected to the base 601 of the retainer 600 by a damper support 605. That is, the damper support 605 extends from both edges of the damper plate 604 (in the horizontal direction (Y direction) toward the base 601. An end portion of the damper support 605 is fixed to a front side of the base 601.

The electrode current collector 540 is joined in the vertical direction (Z direction) of the retainer 600. The second portion 542 of the electrode current collector 540 is accommodated in the space 606, as illustrated in FIG. 6. The second portion 542 of the electrode current collector 540 is located between the damper 603 and the base 601 of the retainer 600. The first portion 541 of the electrode current collector 540 is supported by the damper 603 installed on the retainer 600.

The electrode current collector 540 is joined to an insulator 570. A guide groove 544 is formed at the third portion 543 that connects the first portion 541 and the second portion 542. The guide groove 544 is a space that is formed at the third portion 543 by bending the third portion 543 in a streamline shape, e.g., the groove 544 may be formed through the third portion 543 to be positioned under the first portion 541. The electrode current collector 540 is slidably joined to the insulator 570 through the guide groove 544 in the horizontal direction (X direction).

The insulator 570 includes a housing 571. An insulator plate 572 extends in a horizontal direction from the housing 571. The insulator plate 572 has a size that allows the first portion 541 of the electrode current collector 540 to be safely seated thereon (FIG. 6). The insulator plate 572 is spaced apart from a top portion of the housing 571 of the insulator 570, and a space 573 for accommodating the first portion 541 of the electrode current collector 540 is formed at the space portion.

Although not illustrated, a guide is formed at a bottom portion of the insulator plate 572 from an inside of the housing 571 of the insulator 570. When the third portion 543 of the electrode current collector 540 is joined, the position thereof may be fixed by the guide.

The gasket 560 covering the electrode terminal 550 is inserted into the space 573 between the insulator plate 572 and the top portion of the housing 571 of the insulator 570 and is located on the first portion 541 of the electrode current collector 540.

A process of joining the components at the side portion of the electrode assembly 530 of the secondary battery 500 having the above configuration will be described below.

By inserting the insulator plate 572 in the horizontal direction along the guide groove 544, the third portion 543 of the electrode current collector 540 is slidably joined to the insulator plate 572 of the insulator 570, and the first portion 541 of the electrode current collector 540 is located on the insulator plate 572. For example, as illustrated in FIG. 5, the insulator plate 572 may be inserted through the guide groove 544 of the third portion 543, such that the first portion 541 of the electrode current collector 540 is fitted in the space 573 above, e.g., directly on, the insulator plate 572 (FIG. 6).

The gasket 560 covering the electrode terminal 550 is inserted into the space 573, i.e., above the first portion 541, between the insulator plate 572 and the top portion of the housing 571 of the insulator 570. That is, the gasket 560 is located on the first portion 541 of the electrode current collector 540, and a bottom surface of the electrode terminal 550 is electrically connected to the first portion 541.

The second portion 542 of the electrode current collector 540 is inserted into the space 606 between the damper 603 and the base 601 of the retainer 600 in the vertical direction. The second portion 542 of the electrode current collector 540 is located between the damper 603 and the base 601 of the retainer 600.

The retainer 600 is joined to the side portion of the electrode assembly 530 with the electrode current collector 540 interposed therebetween. The second portion 542 of the electrode current collector 540 is welded to an inner surface 531a of the positive electrode 531 of the electrode assembly 530. The side portion 602 of the retainer 600 is located at an outer surface 531b of the positive electrode 531 of the electrode assembly 530. In the present embodiment, although the positive electrode 531 has been exemplarily described, the negative electrode 532 may also be similarly applied.

The damper 603 protruding from the base 601 of the retainer 600 is located in a space between the adjacent electrodes, i.e., adjacent positive electrodes 531 or adjacent negative electrodes 532. Since the damper 603 is disposed between the positive electrode 531 and the negative electrode 532 that protrude from both sides of the electrode assembly 530, the flowage of the electrode assembly 530 may be prevented.

Figure 7:
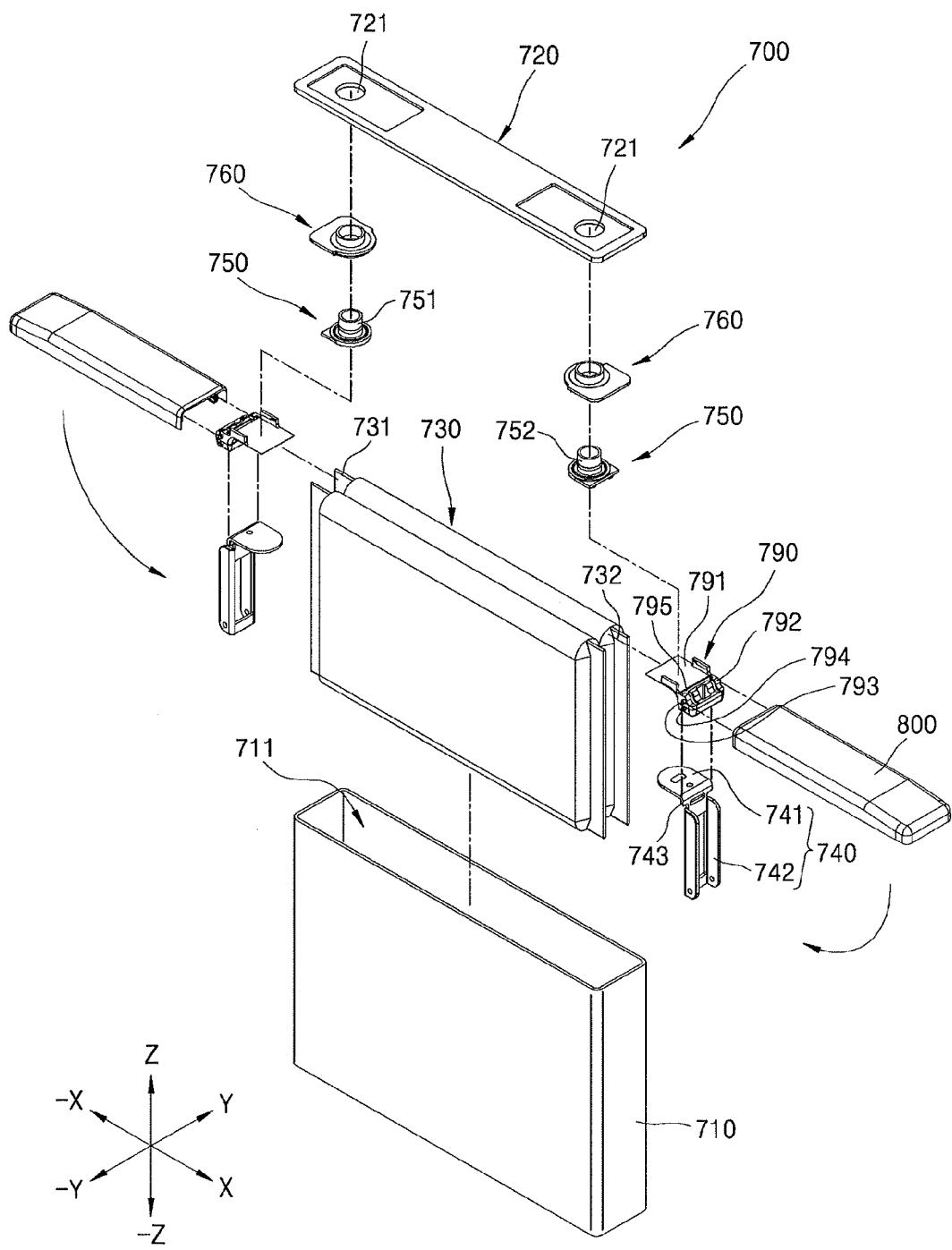
FIG. 7 illustrates an exploded perspective view of a secondary battery according to another embodiment.
Figure 8:
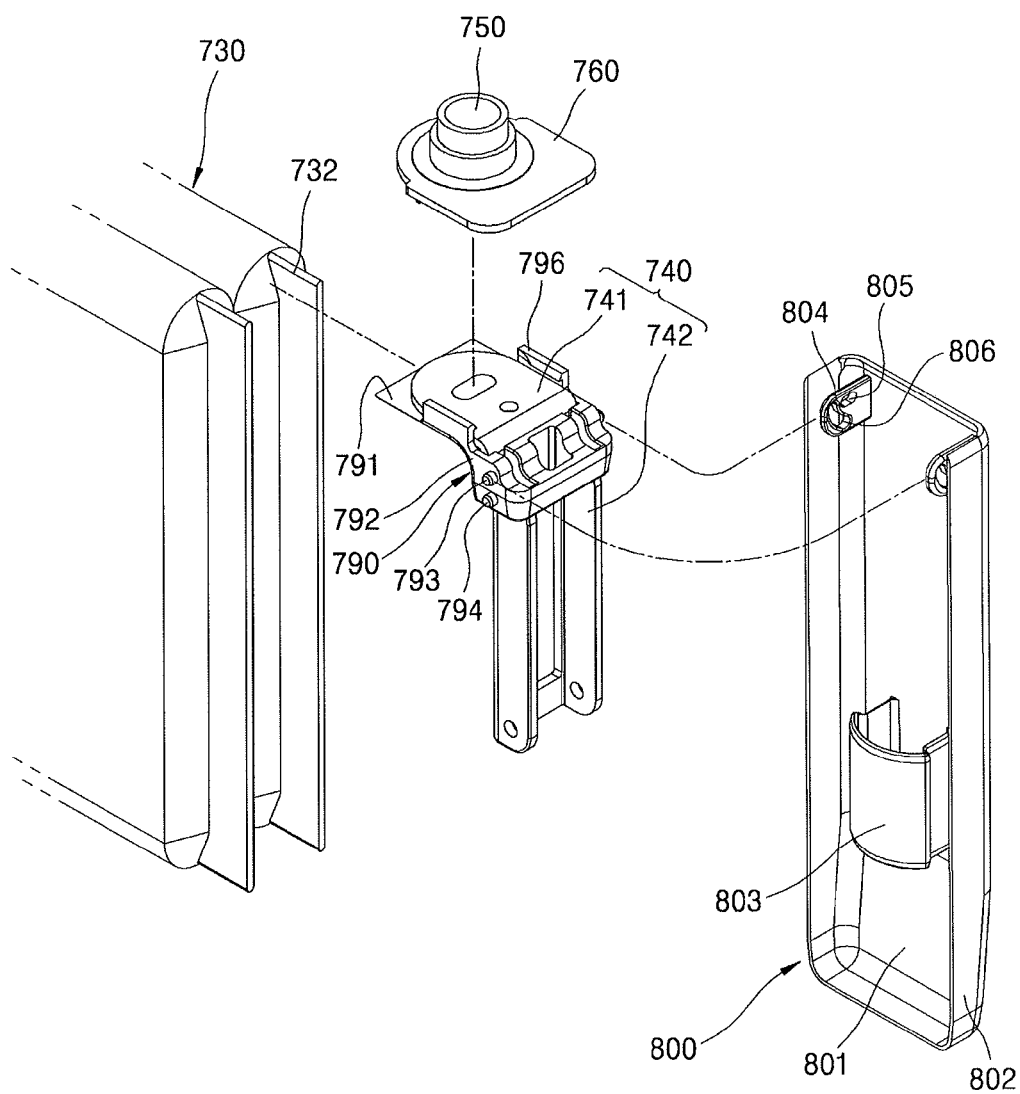
FIG. 8 illustrates an expanded exploded perspective view of a damper in FIG. 7.
Figure 12:
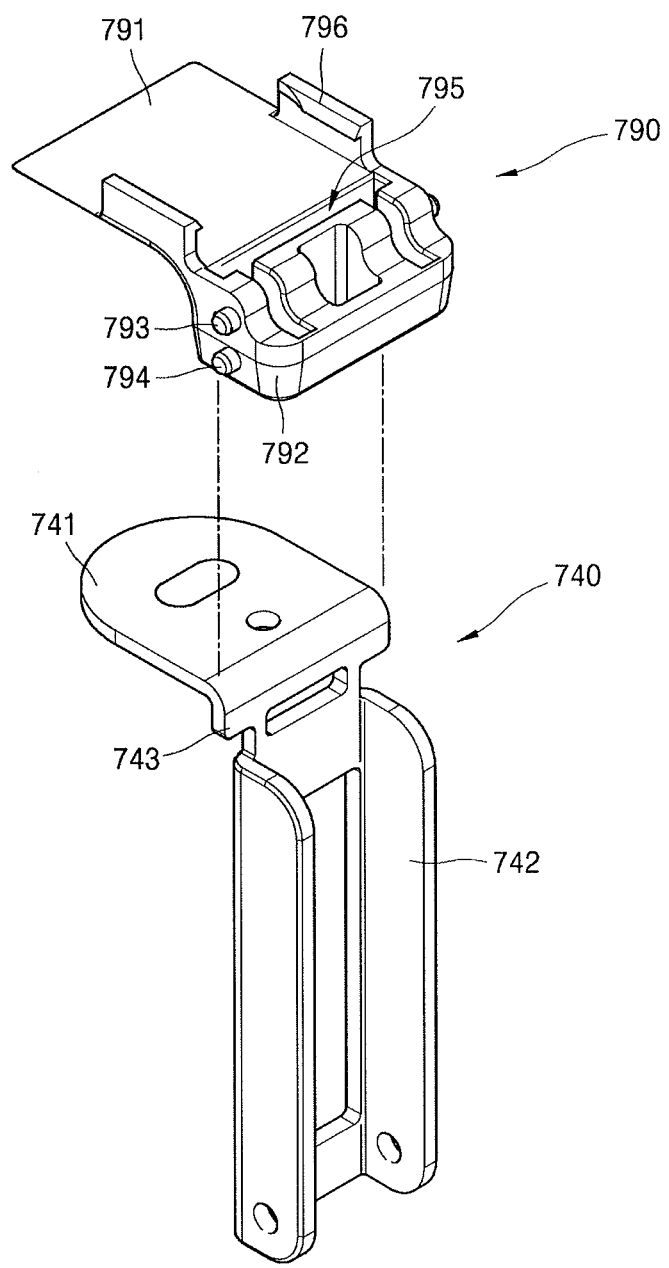
FIG. 12 illustrates an exploded perspective view of the electrode current collector in FIG. 7.

FIG. 7 is an exploded perspective view of the secondary battery 700 according to another embodiment. FIG. 12 is an exploded perspective view of the electrode current collector in FIG. 7. FIG. 8 is an expanded exploded perspective view of a portion at which a damper 803 of FIG. 7 is installed.

Referring to FIGS. 7-8 and 12, the secondary battery 700 may include a case 710, a cap plate 720, an electrode assembly 730, an electrode current collector 740, an electrode terminal 750, a gasket 760, and a retainer 800.

An opening 711 providing a passage for accommodating the electrode assembly 730 may be formed at one side of the case 710. The electrode assembly 730 is accommodated in an internal space of the case 710 through the opening 711. In the present embodiment, two electrode assemblies 730 are provided. In the electrode assembly 730, a positive electrode 731 is disposed in a (−X) direction and a negative electrode 732 is disposed in a (+X) direction.

The cap plate 720 is joined to the case 710. A plurality of terminal holes 721 are formed at the cap plate 720.

The electrode terminal 750 includes a positive electrode terminal 751 and a negative electrode terminal 752. A portion of the electrode terminal 750 protrudes upward from the cap plate 720 after passing through the terminal hole 721 formed at the cap plate 720.

The gasket 760 covers at least a portion of the electrode terminal 750. A portion of the gasket 760 is interposed between the outer periphery of the electrode terminal 750 and the inner periphery of the cap plate 720 at which the terminal hole 721 is formed. The gasket 760 is formed of an insulating material.

The electrode current collector 740 electrically connects the electrode terminal 750 and the electrode assembly 730. The electrode current collector 740 includes a first portion 741 that is substantially parallel to the cap plate 720, and a second portion 742 that extends from the first portion 741 and is bent with respect to the first portion 741. A third portion 743 is formed between the first portion 741 and the second portion 742 to connect the first portion 541 and the second portion 542.

The first portion 741 of the electrode current collector 740 has a plate shape, and the second portion 742 of the electrode current collector 740 is a strip that is bent in a perpendicular direction with respect to the first portion 741 of the electrode current collector 740 and extends by a predetermined length.

The second portion 742 of the electrode current collector 740 includes a plurality of strips that extend in a vertical direction (Z direction) from both edges of the third portion 743 of the electrode current collector 740. In the present embodiment, the second portion 742 of the electrode current collector 740 includes two strips that extend from both edges of the third portion 743.

The first portion 741 of the electrode current collector 740 is electrically connected to the electrode terminal 750 while contacting a bottom surface of the electrode terminal 750. The second portion 742 of the electrode current collector 740 may be electrically connected to the electrode assembly 730 while contacting the positive electrode 731 and the negative electrode 732. The second portion 742 of the electrode current collector 740 may be welded and electrically connected to the positive electrode 731 and the negative electrode 732 of the electrode assembly 730.

The retainer 800 is installed between the electrode current collector 740 and the case 710. The retainer 800 may fix the position of the positive electrode 731 and the position of the negative electrode 732.

In order to prevent the flowage of the adjacent electrode assemblies 730, a damper 803 is installed between the positive electrodes 731 or the negative electrodes 732 of the electrode assembly 730. The damper 803 is joined to a front side of the retainer 600 that faces a side portion of the electrode assembly 730. This will be described below in more detail.

The retainer 800 includes a base 801 and a side portion 802 that is bent from both edges of the base 801 toward the electrode assembly 730. The base 801 is a rectangular plate. The side portion 802 is bent from both edges of the base 801 in a horizontal direction (Y direction).

The damper 803 is formed on a front side of the base 801. In the present embodiment, the damper 803 is integrated with the base 801 and protrudes by a predetermined height from the base 801.

The electrode current collector 740 is joined to an insulator 790. The insulator 790 includes an insulator plate 791 that is parallel to the first portion 741 of the electrode current collector 740. The insulator plate 791 has a size that allows the first portion 740 of the electrode current collector 741 to be safely seated thereon.

A side portion 792 bent in a downward direction is formed at one edge of the insulator plate 791. A through hole 795 is formed at the side portion 792 of the insulator 790 in a width direction, e.g., the through hole 795 may be a slot along the Y direction and may be positioned between the side portion 792 and the insulator plate 791. The through hole 795 provides a path through which the first portion 741 of the electrode current collector 740 may pass. The first portion 741 of the electrode current collector 740 enters the through hole 795 upward from the insulator 790, and is bent by a predetermined angle to be located on the insulator plate 791 of the insulator 790.

A plurality of hinge pins 793 and 794 are formed at the side portion 792 of the insulator 790 such that the retainer 800 may pivot by a predetermined angle with respect to the electrode current collector 740. That is, a plurality of first hinge pins 793 may protrude from both sidewalls of the side portion 792. A plurality of second hinge pins 794 may be formed under the first hinge pins 793.

A plurality of holes 805 and 806 may be formed on the base 801 of the retainer 800. That is, a guide 804 may protrude by a predetermined length on the base 801. For example, a plurality of guides 804 may be spaced apart from each other by a predetermined distance in a horizontal direction of the base 801. The guide 804 has a size that may accommodate the insulator 790.

A first hole 805 is formed in the guide 804 at a position where the first hinge pin 793 is joined. The first hinge pin 793 is hinge-joined to the first hole 805. The first hole 805 may have a circular shape.

A second hole 806 may be formed under the first hole 805 at a position where the second hinge pin 794 is joined. The second hinge pin 794 is joined to the second hole 806 such that the retainer 800 may pivot by a predetermined angle. The second hole 806 is formed in a streamline shape such that the second hinge pin 794 may move.

When the insulator 790 integrated with the electrode current collector 740 is joined to the retainer 800, the first hinge pin 793 is joined to the first hole 805 and the second hinge pin 794 is hinge-joined to the second hole 806. Accordingly, the retainer 800 may pivot by a predetermined angel with respect to the electrode current collector 740.

A plurality of hooks 796 are formed at both edges of the insulator plate 791 of the insulator 790. The first portion 741 of the electrode current collector 740 and the electrode terminal 750 located on the first portion 741 are fastened to the hooks 796 to be fixed onto the insulator plate 791.

A process of joining the components at the side portion of the electrode assembly 730 of the secondary battery 700 having the above configuration will be described below.

The first portion 741 of the electrode current collector 740 passes through the through hole 795, which is formed at the side portion 792 of the insulator 790, upward from the insulator 790, and is then bent toward the insulator plate 791. The gasket 760 covering the electrode terminal 750 is located on the first portion 741 of the electrode current collector 740, and is fixed by the hooks 796 formed at the insulator 790, together with the first portion 741 of the electrode current collector 740.

The insulator 790 is joined to the retainer 800. In this case, the first hinge pin 793 formed at the side portion 792 of the insulator 790 is hinge-joined to the first hole 805 formed at the guide 804 of the retainer 800. The second hinge pin 794 disposed under the first hinge pin 793 is hinge-joined to the second hole 806 disposed under the first hole 805.

The retainer 800 is joined to the side portion of the electrode assembly 730 while the electrode current collector 740 joined to the insulator 790 is interposed therebetween. The second portion 742 of the electrode current collector 740 may be welded to the positive electrode 731 and the negative electrode 732 of the electrode assembly 730.

In this case, since the retainer 800 is pivotally joined to the electrode assembly 730 by hinge joint, the retainer 800 may pivot by about 90 degrees with respect to the electrode current collector 740 as illustrated in FIG. 7. Accordingly, the weldability of the electrode current collector 740 with respect to the positive electrode 731 and the negative electrode 732 is improved.

Subsequently, the retainer 800 is pivoted in an arrow direction to cover the side portion of the electrode assembly 730. In this case, the damper 803 protruding from the base 801 of the retainer 800 is located in a space between the adjacent electrodes, i.e., between adjacent positive electrodes 731 and/or between adjacent negative electrodes 732. Since the damper 803 is disposed between the positive electrode 731 and the negative electrode 732 that protrude from both sides of the electrode assembly 730, the flowage of the electrode assembly 730 may be prevented.

Figure 9:
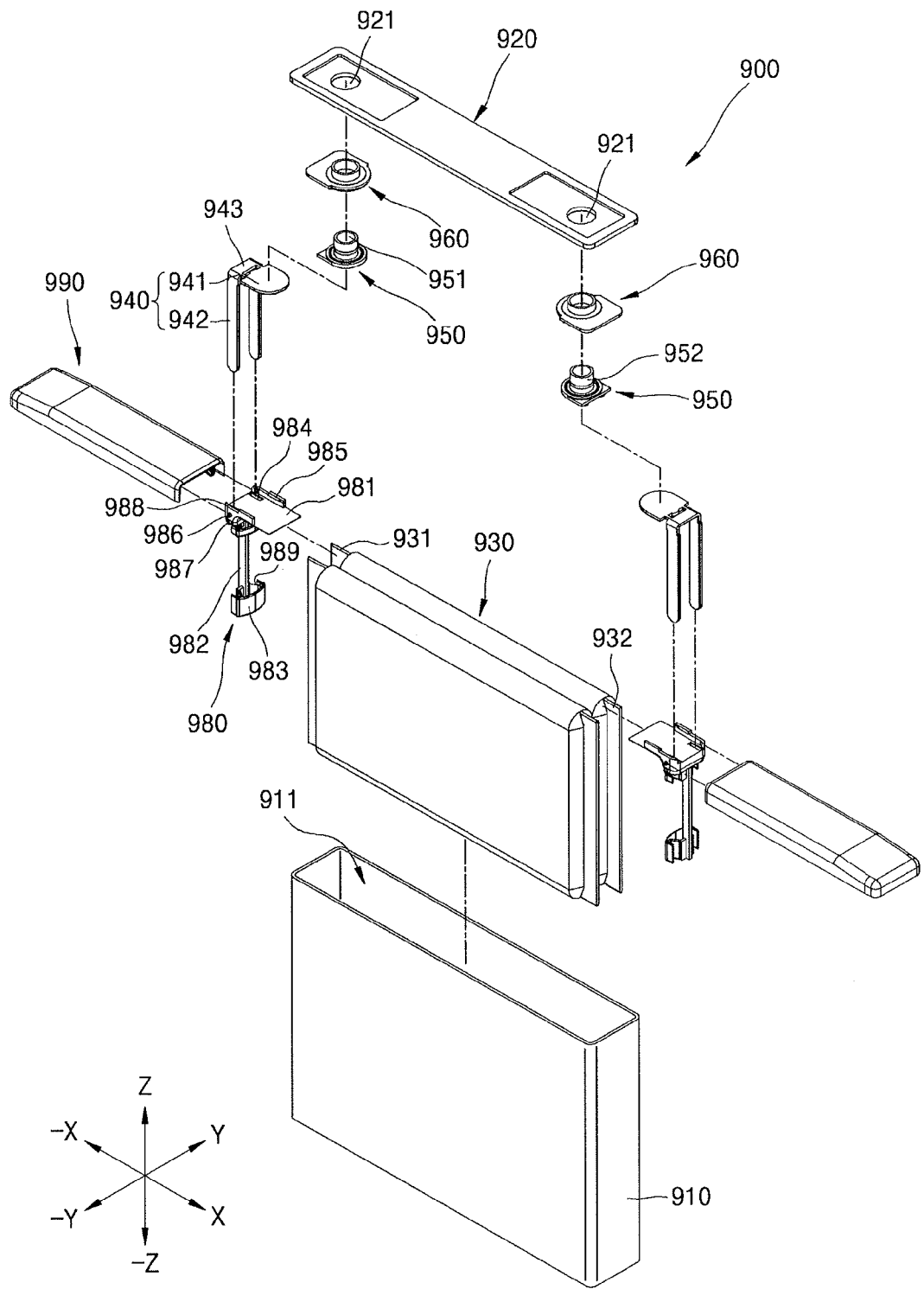
FIG. 9 illustrates an exploded perspective view of a secondary battery according to another embodiment.
Figure 10:
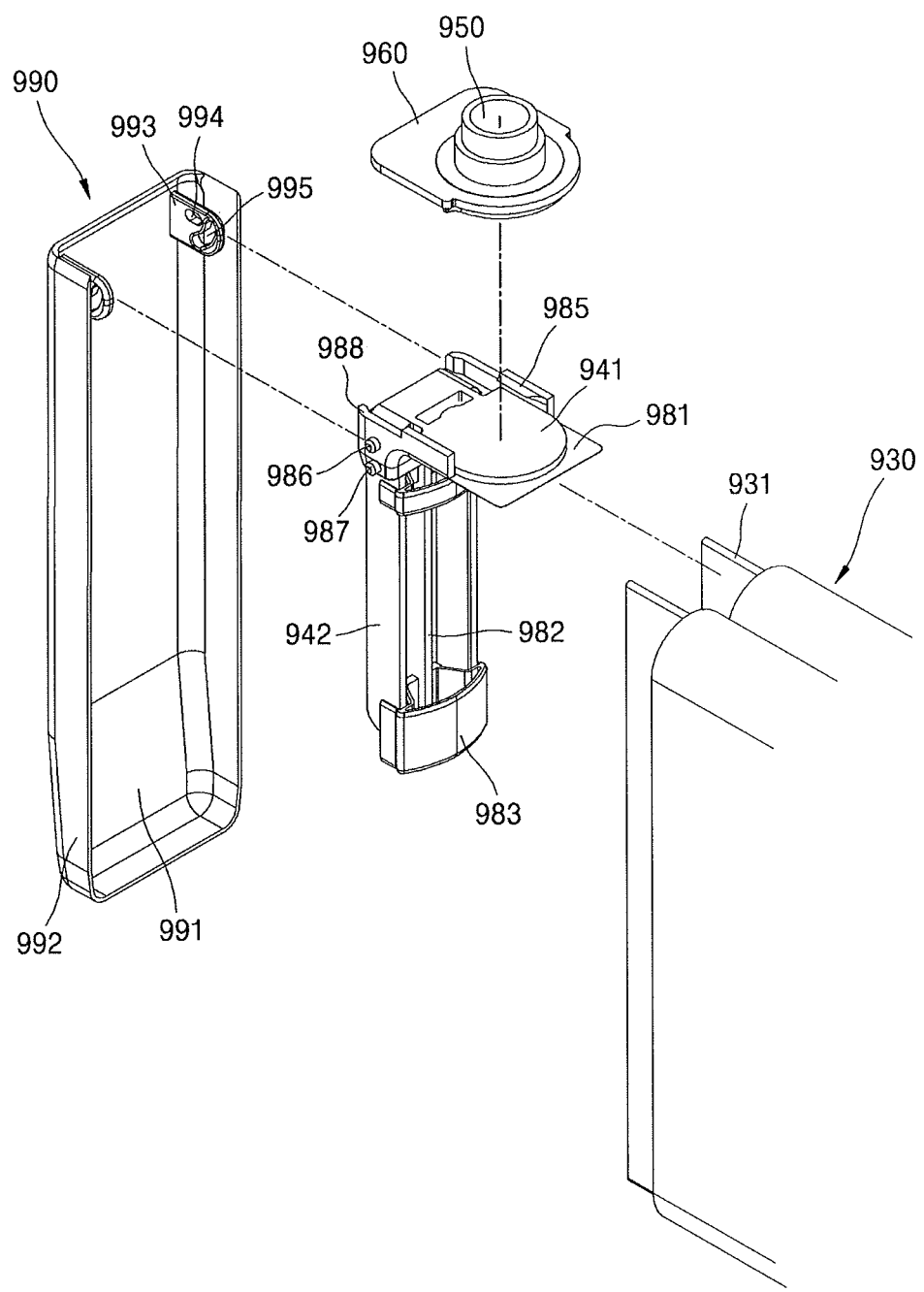
FIG. 10 illustrates an expanded exploded perspective view of a damper in FIG. 9.

FIG. 9 is an exploded perspective view of the secondary battery 900 according to another embodiment. FIG. 10 is an expanded exploded perspective view of a portion at which a damper 903 of FIG. 9 is installed.

Referring to FIGS. 9 and 10, the secondary battery 900 may include a case 910, a cap plate 920, an electrode assembly 930, an electrode current collector 940, an electrode terminal 950, a gasket 960, and a retainer 990.

An opening 911 providing a passage for accommodating the electrode assembly 930 may be formed at one side of the case 910. The electrode assembly 930 is accommodated in an internal space of the case 910 through the opening 911. In the present embodiment, two electrode assemblies 930 are provided. In the electrode assembly 930, a positive electrode 931 is disposed in a (−X) direction and a negative electrode 932 is disposed in a (+X) direction.

The cap plate 920 is joined to the case 910. A plurality of terminal holes 921 are formed at the cap plate 920.

The electrode terminal 950 includes a positive electrode terminal 951 and a negative electrode terminal 952. A portion of the electrode terminal 950 protrudes upward from the cap plate 920 after passing through the terminal hole 921 formed at the cap plate 920.

The gasket 960 covers at least a portion of the electrode terminal 950. A portion of the gasket 960 is interposed between the outer periphery of the electrode terminal 950 and the inner periphery of the cap plate 920 at which the terminal hole 921 is formed. The gasket 960 is formed of an insulating material.

The electrode current collector 940 electrically connects the electrode terminal 950 and the electrode assembly 930. The electrode current collector 940 includes a first portion 941 that is substantially parallel to the cap plate 920, and a second portion 942 that extends from the first portion 941 and is bent with respect to the first portion 941. A third portion 943 is formed between the first portion 941 and the second portion 942 to connect the first portion 941 and the second portion 942.

The first portion 941 of the electrode current collector 940 has a plate shape, and the second portion 942 of the electrode current collector 940 is a strip that is bent in a perpendicular direction with respect to the first portion 941 of the electrode current collector 940 and extends by a predetermined length.

The second portion 942 of the electrode current collector 940 includes strips that extend downward from both edges of the third portion 943 of the electrode current collector 940. In the present embodiment, the second portion 942 of the electrode current collector 940 includes two strips that extend from both edges of the third portion 943 in a vertical direction (Z direction).

The first portion 941 of the electrode current collector 940 is electrically connected to the electrode terminal 950 while contacting a bottom surface of the electrode terminal 950. The second portion 942 of the electrode current collector 940 may be electrically connected to the electrode assembly 930 while contacting the positive electrode 931 and the negative electrode 932. The second portion 942 of the electrode current collector 940 may be welded and electrically connected to the positive electrode 931 and the negative electrode 932 of the electrode assembly 930.

The retainer 800 is installed between the electrode current collector 940 and the case 910. The retainer 800 may fix the position of the positive electrode 931 and the position of the negative electrode 932.

In order to prevent the flowage of the adjacent electrode assemblies 930, a damper 980 is installed between the positive electrodes 931 or the negative electrodes 932 of the electrode assembly 930. The damper 980 is joined to a front side of the retainer 990 that faces a side portion of the electrode assembly 930. This will be described below in more detail.

The retainer 990 includes a base 991 and a side portion 992 that is bent from both edges of the base 991 toward the electrode assembly 930. The base 991 is a rectangular plate. The side portion 992 is bent from both edges of the base 991 in a horizontal direction (Y direction).

The damper 980 is disposed on a front side of the base 991. Unlike the above embodiments, the damper 980 is formed as a separate member and is joined to the retainer 990.

The damper 980 includes at least one damping portion 983 that protrudes from the front side of the base 991 of the retainer 990 toward the electrode assembly 930. The damping portion 983 has a streamline plate shape. A space 989 for accommodating the second portion 941 of the electrode current collector 940 is formed between the damping portion 983 and the base 991 and the retainer 990.

A guide shaft 982 is formed on a rear side of the damping portion 983 to support the damping portion 983. The guide shaft 982 is installed in the vertical direction (Z direction) and is integrally connected to the damping portion 983.

A damping plate 981 is formed at an upper end of the guide shaft 982 in a direction that is parallel to the first portion 941 of the electrode current collector 940. A side portion 988 is formed between the damping plate 981 and the guide shaft 982 to connect the damping plate 981 and the guide shaft 982. The damping plate 981 is bent from the guide shaft 982. The damping plate 981 has a size that allows the first portion 941 of the electrode current collector 940 to be safely seated thereon.

A through hole 984 is formed at both edges of the side portion 988. The through hole 984 provides a path through which the second portion 942 of the electrode current collector 940 may pass. The second portion 942 of the electrode current collector 940 is joined by passing through the through hole 984 downward from the top portion of the damper 980. The first portion 941 of the electrode current collector 940 is bent toward the damping plate 981 to be located on the damping plate 981. The second portion 942 of the electrode current collector 940 is disposed between the damping portion 983 and the base 991 of the retainer 990.

A plurality of hinge pins 986 and 987 are formed at the side portion 988 of the damper 980 such that the retainer 990 may pivot by a predetermined angle with respect to the electrode current collector 940. That is, a plurality of first hinge pins 986 protrudes from both sidewalls of the side portion 988. A plurality of second hinge pins 987 are formed under the first hinge pins 986.

A guide 993 protrudes by a predetermined length on the base 991 of the retainer 990. A plurality of holes 994 and 995 are formed at the guide 993. For example, a plurality of guides 993 is spaced apart from each other by a predetermined distance in a horizontal direction of the base 991. The guide 993 has a size that may accommodate the side portion 988 of the damper 980.

A first hole 994 is formed in the guide 993 at a position where the first hinge pin 986 is joined. The first hinge pin 986 is hinge-joined to the first hole 994. The first hole 994 may have a circular shape.

A second hole 995 is formed under the first hole 994 at a position where the second hinge pin 987 is joined. The second hole 995 is formed in a streamline shape such that the second hinge pin 987 may move.

When the damper 980 joined to the electrode current collector 940 is joined to the retainer 990, the first hinge pin 986 is hinge-joined to the first hole 994 and the second hinge pin 987 is hinge-joined to the second hole 995. Accordingly, the retainer 990 may pivot by a predetermined angel with respect to the electrode current collector 940.

A plurality of hooks 985 are formed at both edges of the damping plate 981. The first portion 941 of the electrode current collector 940 and the electrode terminal 950 located on the first portion 941 are fastened to the hooks 985 to be fixed onto the damping plate 981.

A process of joining the components at the side portion of the electrode assembly 930 of the secondary battery 900 having the above configuration will be described below.

The second portion 942 of the electrode current collector 940 passes through the through hole 984, which is formed at the side portion 988 of the damper 980, upward from the damper 980, and is positioned in the space 989 formed by the damping portion 983. Once the second portion 942 is inserted completely through the through hole 984, the first portion 941 is positioned on the damping plate 981.

Next, the gasket 960 covering the electrode terminal 950 is positioned on the first portion 941 of the electrode current collector 940, and is fixed by the hooks 985 formed at the damping plate 981, together with the first portion 941 of the electrode current collector 940. The damper 980 joined to the electrode current collector 940 is joined to the retainer 990. In this case, the first hinge pin 986 formed at the side portion 988 of the damper 980 is hinge-joined to the first hole 994 formed at the guide 993 of the retainer 990. Also, the second hinge pin 987 disposed under the first hinge pin 986 is hinge-joined to the second hole 995 disposed under the first hole 994.

The retainer 990 is joined to the side portion of the electrode assembly 930 while the electrode current collector 940 joined to the damper 980 is interposed therebetween. The second portion 942 of the electrode current collector 940 may be welded to the positive electrode 931 and the negative electrode 932 of the electrode assembly 930. In this case, the retainer 990 pivots by about 90 degrees with respect to the electrode current collector 904.

Subsequently, the retainer 990 is pivoted to cover the side portion of the electrode assembly 930. The damping portion 983 provided at the damper 980 is located in a space between the adjacent electrodes, that is, the adjacent positive electrodes 931 or the adjacent negative electrodes 932. In this manner, since the damper 980 is disposed between the positive electrodes 930 and the negative electrodes 931 of the electrode assembly 930, the flowage of the electrode assembly 930 may be prevented.

As described above, according to the one or more of the above embodiments, the secondary battery has an improved insulating function, thereby providing increased electrical and structural stability. That is, since the damper is disposed between adjacent electrode assemblies, the flowage, e.g., electrical contact, of the electrode assemblies may be prevented. Also, the assemblage of the secondary battery is simplified.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
    a case having an opening therein;
    a cap plate attached to the case;
    a plurality of electrode assemblies in the case, each electrode assembly including a positive electrode plate, a negative electrode plate, and a separator between the positive electrode plate and the negative electrode plate, and uncoated edges of the positive and negative electrode plates extending out of each electrode assembly defining electrodes;
    an electrode terminal protruding outside the cap plate, a gasket covering the electrode terminal;
    an electrode current collector electrically connecting the electrode assemblies and the electrode terminal;
    a retainer between the electrode current collector and the case, the retainer being connected to the electrode assemblies and being moveable with respect to the electrode current collector, and wherein the retainer is pivotally joined to the electrode current collector by a hinge joint and covers a side portion of the electrode assembly by pivoting in one direction; and
    a damper on a front side of the retainer that faces the electrode assemblies, the damper extending to be positioned between the electrodes of adjacent electrode assemblies, and at least one of the retainer or damper has a surface securing the retainer to the electrode current collector.

2. The secondary battery as claimed in claim 1, wherein: the electrode current collector includes:
    a first portion parallel to the cap plate, the first portion being electrically connected to the electrode terminal,
    a second portion bent with respect to the first portion, the second portion being connected to the electrodes of the electrode assemblies, and
    a third portion connecting the first portion and the second portion to each other, and the electrode current collector is attached to the retainer.

3. The secondary battery as claimed in claim 2, wherein: the retainer includes a base and a side portion bent from the base,
    the damper protrudes from a front side of the base toward the electrode assemblies,
    the electrode current collector is attached to an insulator, and
    the retainer is attached to the insulator via a hinge, the retainer being movable via the hinge with respect to the electrode current collector.

4. The secondary battery as claimed in claim 3, wherein: the insulator includes:
    an insulator plate, and
    a side portion bent from one edge of the insulator plate, the side portion including a through hole, a first hinge pin on each sidewall of the side portion, and a second hinge pin under the first hinge pin, and
    the electrode current collector passes through the through hole of the side portion, the first portion of the electrode current collector being on the insulator plate.

5. The secondary battery as claimed in claim 4, wherein the first portion of the electrode current collector is bent toward the insulator plate, a portion of the third portion of the electrode current collector being in the through hole of the side portion of the insulator.

6. The secondary battery as claimed in claim 5, wherein the insulator plate includes a plurality of hooks at edges thereof, the first portion of the electrode current collector and the electrode terminal being fastened to the hooks.

7. The secondary battery as claimed in claim 4, wherein:
    the base of the retainer includes a plurality of guides, each guide including a first hole having a circular shape and a second hole having a streamlined shape,
    the first hinge pin being attached to the first hole, and
    the second hinge pin being attached to the second hole, the second hinge pin being movable along the second hole to pivot the retainer with respect to the electrode current collector.

8. The secondary battery as claimed in claim 2, wherein:
    the retainer includes a base and a side portion bent from the base,
    the damper is on a front side of the base and is attached to the electrode current collector, and
    the retainer is attached to the damper via a hinge, the retainer being movable via the hinge with respect to the electrode current collector.

9. The secondary battery as claimed in claim 8, wherein the damper includes:
    at least one damping portion protruding from the front side of the base toward the electrode assemblies, the first portion of the electrode current collector being on a damping plate;
    a guide shaft on a rear side of the damping portion to support the damping portion;
    the damping plate bent from an upper end of the guide shaft; and
    a side portion between the guide shaft and the damping plate to connect the guide shaft and the damping plate, the side portion including a through hole, a first hinge pin on each sidewall of the side portion, and a second hinge pin under the first hinge pin, the electrode current collector passing through the through hole of the side portion.

10. The secondary battery as claimed in claim 9, wherein:
    the second portion of the electrode current collector extends in a vertical direction from edges of the third portion and passes through the through hole of the side portion of the damper in a downward direction from a top portion of the damping plate, and
    the first portion of the electrode current collector being bent toward the damping plate to be disposed on the damping plate.

11. The secondary battery as claimed in claim 10, wherein the second portion of the electrode current collector is located in a space between the damping portion and the base of the retainer.

12. The secondary battery as claimed in claim 9, wherein the damping plate includes a plurality of hooks at edges thereof, the first portion of the electrode current collector and an electrode terminal located on the first portion being fastened to the hook to be fixed to the damping plate.

13. The secondary battery as claimed in claim 9, wherein:
the base of the retainer includes a guide, the guide including a first hole having a circular shape and a second hole having a streamlined shape,
the first hinge pin is attached to the first hole, and
the second hinge pin is attached to the second hole, the second hinge pin being movable along the second hole to have the retainer pivot with respect to the electrode current collector.

\* \* \* \* \*